BEST AVAILABLE COPY

Sheet 1. 2 Sheets.

E. W. Brown.

Shuttle Box

No. 1,901. Reissued Mar. 14, 1865.

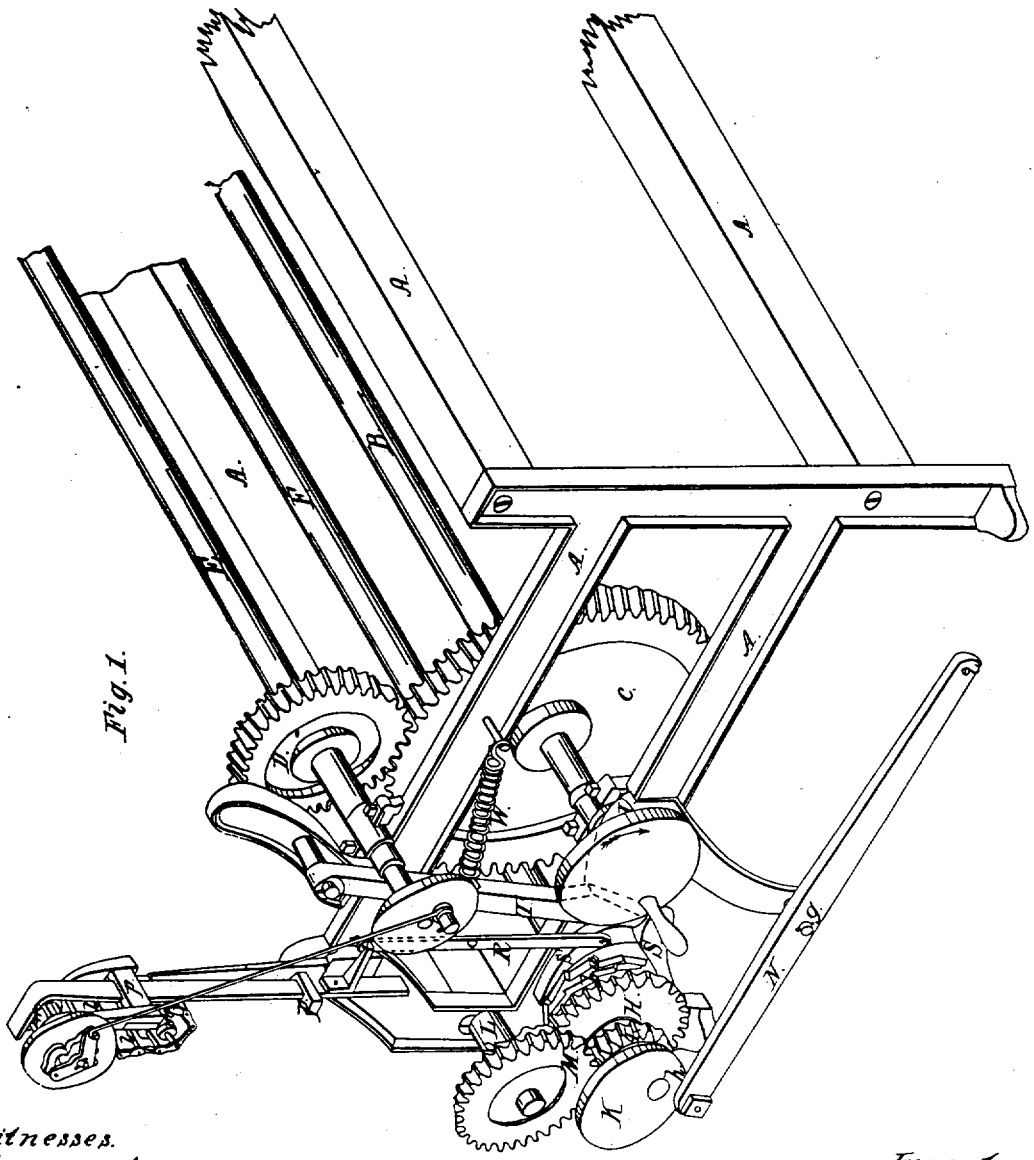

Witnesses.
Elias M. Jones
Arnold W. Smith

Inventor.
Edward W. Brown

No. 1,901.—MERRILL A. FURBUSH, Philadelphia, Penn., and GEORGE CROMPTON, Worcester, Mass., assignees of EDWARD W. BROWN, Fall River, Mass.—*Loom.*—Patented July 25, 1854; reissued March 14, 1865.

*Claim.*—First, the combination of the pattern chain, the pawls, and the reversible tappet shaft, or their equivalents, substantially as described.

Second, the tappet shaft, constructed and operating substantially as herein described, to turn about its axis in either direction, or remain at rest, as desired, for the purpose specified.

Third, the reversible tappet shaft, or its equivalent, in combination with the pawls or their equivalents, constructed and arranged substantially as described and for the purpose specified.

Sheet 2, 2 Sheets.

E. W. Brown.

Shuttle Box.

No. 1,901. Reissued Mar. 14, 1865.

Witnesses.
Elias M. Jones
Arnold H. Smith

Inventor.
Edward W. Brown

H. PETERS, PHOTO-LITHOGRAPHER, WASHINGTON, D. C.

UNITED STATES PATENT OFFICE.

EDWARD W. BROWN, OF WOONSOCKET, RHODE ISLAND, ASSIGNOR TO MERRILL A. FURBUSH, OF PHILADELPHIA, PENNSYLVANIA, AND GEORGE COMPTON, OF WORCESTER, MASSACHUSETTS.

IMPROVEMENT IN LOOMS.

Specification forming part of Letters Patent No. 11,352, dated July 25, 1854; Reissue No. 1,901, dated March 14, 1865.

*To all whom it may concern:*

Be it known that I, EDWARD W. BROWN, of Woonsocket, in the State of Rhode Island, formerly of Fall River, in the county of Bristol and State of Massachusetts, have invented certain new and useful Improvements in Looms for Weaving Checks and Plaids; and I hereby declare the following to be a full, clear, and exact description of the same, reference being had to the annexed drawings, making a part of this specification, in which—

Figure 3:
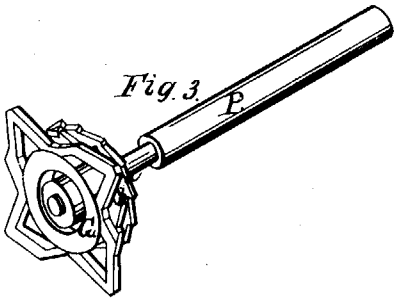
Figure 4:
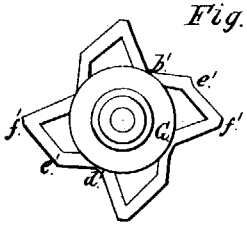
Figure 5:
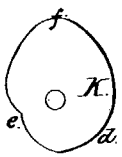
Figure 2:
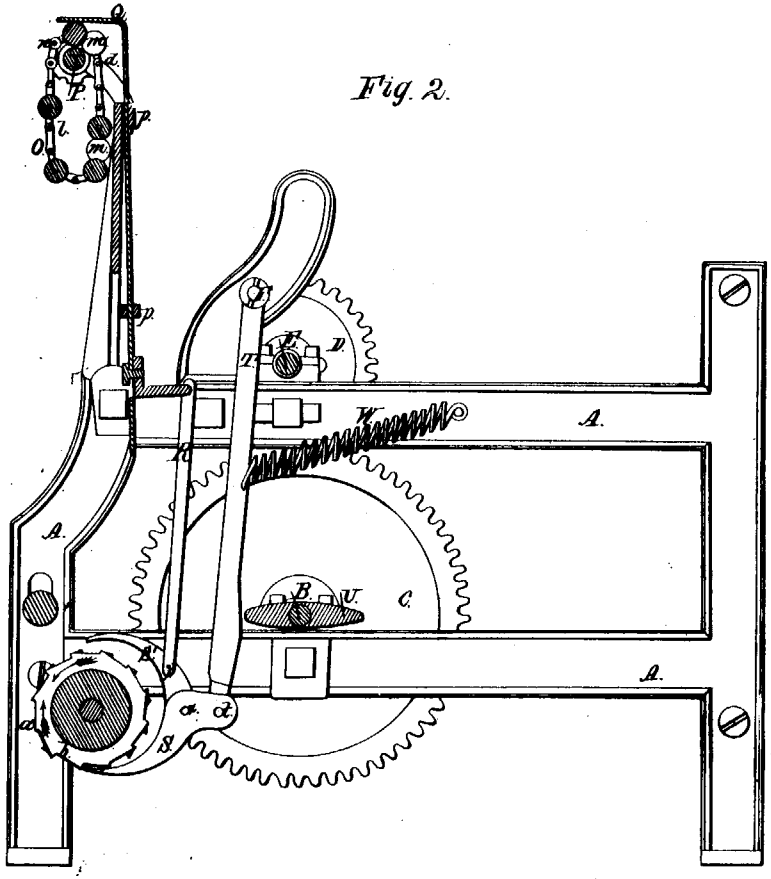

Figure 1 is an isometric perspective of a loom with my improvements attached, those portions of the loom not necessarily connected with my improvements not being represented. Fig. 2 is a transverse section through the same, immediately in front of the ratchet-wheel upon the cam-shaft. Fig. 3 is an isometric view of the box-cam, which may be employed to give motion to the shuttle-boxes in place of the arrangement represented in Fig. 1. Fig. 4 is a front view of the cam-wheel represented in Fig. 3. Fig. 5 is a view of the cam represented in Fig. 1, at K.

In fancy-looms, as heretofore constructed it has been common to operate the drop-boxes by means of a series of tappets or a tappet-wheel upon a tappet shaft, which was rotated intermittently by a pawl so combined with the pattern-chain as to engage or not engage with the tappet-shaft, and rotate it or leave it at rest, according to the alterations of the pattern-chain. This arrangement presented the advantage, among others, that the order of the tappets being according to the option of the weaver, he was enabled to adapt his apparatus to weaving with two shuttles, or to weaving with three shuttles, according to the character of his pattern; but from the fact that the tappet shaft was rotated in one direction only, it was not always possible, where three shuttles were used, to make the desired transition from one shuttle to another.

By giving to the tappet-shaft a motion about its axis in either direction, or permitting it to rest at pleasure, it will be perceived that while retaining the advantages above referred to the weaver is enabled to interchange three shuttles in any order desired and weave any variety of pattern which that number of shuttles is capable of producing.

A is the frame-work of the machine; B, the driving-shaft, carrying the cog-wheel C, which gears with the wheel D upon the lathe-shaft E.

F is the tappet-shaft, which carries the tappet-wheel G, Figs. 3 and 4, or other appropriate devices for moving the shuttleboxes.

*a b* are ratchet-wheels secured to the shaft F, and having teeth pointed indifferent directions.

In Fig. 1, H is a cog-wheel secured to the tappet-shaft F.

I is a cog-wheel made fast to the cam K, the two running together loosely upon the shaft F.

L is a short shaft secured to the main frame, having a cogged pinion, *c*, and a cog-wheel, M, running together loosely thereon. The wheel M engages with the wheel I, and the wheel H with pinion *c*. The cam K, Fig. 5, has three rests, *d e f*, one hundred and twenty degrees distant from each other, and the gears H C M I are so arranged and proportioned with respect to each other that when the tappet-shaft is revolved an amount equal to the length of one of the teeth of the ratchet-wheels *a b* the cam shall be caused to make the third of a revolution.

N is a lever pivoted near its center, at *g*, and carrying a roller, *h*, at one end, which rests against the periphery of the cam K, and is made to bear upon the rests *d e f* as the cam revolves. The other end of the lever N is connected at *i* with the foot of the apparatus which raises and lowers the boxes, but which, not differing from that usually employed for this purpose, is not shown in the drawings.

O is the pattern-chain, which governs the motion of the tappet-shaft. This chain is made to revolve intermittently upon the shaft P in the usual manner by means of the connections (seen in Fig. 1) with the lathe-shaft E. The spindles *l* of this chain may be made to carry rollers of two different sizes, *m n*, or they may run empty.

Q is a bent rod sliding freely up and down in mortises in the supports *p* and connected with the arm R, by which the pawls S S′ are actuated.

T is an arm pivoted to the frame-work at *r*, and borne against the cam U upon the main driving-shaft B by the spring W.

The pawls S and S′ are connected together in the following manner: The former is pivoted to the arm T at *t*. The pawl S′ is secured to the pawl S at *x*, the two being allowed to move freely upon the point *t*. If, now, the pattern-chain O be in the position represented in Fig. 2, the rod Q will be raised to its extreme height by the rollers *m*, and the pawl S will be brought in contact with the ratchet-wheel *b*, and as the main shaft B revolves the cam U vibrates the arm T, and the cam-shaft F is revolved in the direction indicated by the red arrow, Fig. 2, and the shuttle boxes are raised or lowered, as the case may be, according to the position of the cam K. When the roller *n* is beneath the horizontal portion of the rod Q, neither of the pawls S S′ is in contact with its ratchet-wheel, and as the cam U revolves no motion will be communicated to the shaft F, and the shuttle-boxes remain stationary. When, by the revolution of the pattern-chain, one of the spindles *l* intervenes between the shaft P and the rod Q, the latter descends to its lowest position, and the pawl S′ comes in contact with the teeth of the ratchet-wheel *a*, and as the cam U revolves the cam-shaft E is revolved in the direction indicated by the black arrow. It will thus be perceived that by means of the spindles *l* and the rollers *m n*, I am enabled, as may be required, to revolve the tappet-shaft in either direction, or to allow it to remain at rest while the other motions of the loom continue.

It is evident that no contingency, carelessness, or accident can bring the two pawls simultaneously in contact with their ratchet-wheels, for, should the connection *y*, or any of the parts immediately above it, give way, the pawl S′ falls upon its ratchet-wheel, and the other pawl falls with it, or should either of the connections *x*, *t*, or *r*, be broken, no further breakage or injury could result from the accident.

In the arrangement represented in Fig. 1, for the purpose of transmitting the motion of the ratchet-wheels to the cam K, it will be perceived that the shuttle-boxes are raised with a small expenditure of power compared with what is required to revolve the cam G, owing to the gradual ascent between the rests *d e f* of the cam K. The ordinary cam, G, (represented in Figs. 3 and 4,) may, however, be made use of in connection with the method described, of driving the cam-shaft, in which case, the ratchet-wheels having twelve teeth, the cam-shaft will be caused to make a twelfth of a revolution each time the pawls S S′ impinge against the teeth of the ratchet-wheels, and the roller *h* will bear against the periphery of the cam-wheel, and rest at the points *d′ e′ f′*. Owing, however, to the steepness of the ascent between the rests *d′* and *f′*, much more friction will result from the arrangement of parts than where the cam K is employed.

The particular arrangement of parts above described possesses several advantages, among which may be enumerated the following: But a single pattern-chain is used to operate both the ratchet-wheels; but one connection, and that a simple rod or vertical bar, is required between the pattern-chain and the pawls S S′, while the pawls are so connected together that under no circumstances can the two be brought simultaneously into contact with their ratchet-wheels, and thus all risk of breakage from any accidents to the parts in connection with the pawls is avoided. And I consider this arrangement the best mode in which I have contemplated the application of my invention; but it is obvious that the particular arrangement may be varied without departing from the principle of my invention.

What I claim as my invention, and desire to secure by Letters Patent, is—

1. The combination of the pattern-chain, the pawls, and the reversible tappet-shaft, or their equivalents, substantially as described.

2. The tappet-shaft, constructed and operating, substantially as herein described, to turn about its axis in either direction or remain at rest, as desired, for the purpose specified.

3. The reversible tappet-shaft, or its equivalent, in combination with the pawls or their equivalent, constructed and arranged substantially as described, and for the purpose specified.

EDWARD W. BROWN.

Witnesses:

ELIAS M. JENCKES,
ARNOLD H. SMITH.